(12) United States Patent
Vincenzotto et al.

(10) Patent No.: US 12,528,606 B2
(45) Date of Patent: Jan. 20, 2026

(54) COMBAT AIRCRAFT WITH ELECTRICAL WEAPON SYSTEM WITH OPTIMIZED POWER MANAGEMENT

(71) Applicant: SAFRAN HELICOPTER ENGINES, Bordes (FR)

(72) Inventors: Quentin Vincenzotto, Moissy-Cramayel (FR); Fabien Mercier-Calvairac, Moissy-Cramayel (FR); Jean-Baptiste Jarin, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 190 days.

(21) Appl. No.: 18/552,351

(22) PCT Filed: Mar. 22, 2022

(86) PCT No.: PCT/FR2022/050529
§ 371 (c)(1),
(2) Date: Sep. 25, 2023

(87) PCT Pub. No.: WO2022/200732
PCT Pub. Date: Sep. 29, 2022

(65) Prior Publication Data
US 2024/0158109 A1 May 16, 2024

(30) Foreign Application Priority Data
Mar. 26, 2021 (FR) ........................................ 2102946

(51) Int. Cl.
B64U 20/83 (2023.01)
B64U 10/25 (2023.01)
(Continued)

(52) U.S. Cl.
CPC ............. *B64U 20/83* (2023.01); *B64U 10/25* (2023.01); *B64U 50/34* (2023.01); *B64U 2101/15* (2023.01)

(58) Field of Classification Search
CPC ............... F41H 13/0043; F41H 13/005; F41H 13/0056; F41H 13/0062; F41H 13/0068;
(Continued)

(56) References Cited

U.S. PATENT DOCUMENTS 9,771,157 B2    9/2017  Gagne et al.
11,323,214 B2*  5/2022  MacAfee .................. H04L 1/08
(Continued)

FOREIGN PATENT DOCUMENTS

EP    3663197 A1    6/2020

OTHER PUBLICATIONS

Search Report for French application No. 2102946 dated Nov. 23, 2021.
(Continued)

Primary Examiner — Joshua E Rodden
(74) Attorney, Agent, or Firm — McDonald Hopkins LLC

(57) ABSTRACT

A fixed-wing combat aircraft including an electrical power source, a propulsion system, a low-power non-propulsion assembly including a flight control system, a high-power non-propulsion assembly including an electrical weapon system, and a management unit configured to selectively establish on command multiple operating modes including: a flight mode, in which the management unit distributes the electrical power supplied by the electrical power source to the propulsion system and to the low-power non-propulsion assembly, and an attack mode, in which the management unit limits the electrical power supplied by the electrical power source to the propulsion system and to the low-power non-propulsion assembly to the power required to allow the
(Continued)

aircraft to glide, and reserves a majority of the available electrical power for the high-power non-propulsion assembly.

10 Claims, 3 Drawing Sheets

(51) Int. Cl.
*B64U 50/34* (2023.01)
*B64U 101/15* (2023.01)

(58) Field of Classification Search
CPC ............. F41H 13/0075; F41H 13/0081; F41H 13/0087; F41H 13/0093; B64U 10/25; B64U 20/83; B64U 50/34; B64U 2101/15; B64D 7/00; B64D 27/30; B64D 27/31; B64D 27/32; B64D 27/33; B64D 27/34; B64D 27/35; B64D 27/355; B64D 27/357; B64D 27/359; B60L 1/00; B60L 1/08; B60L 50/00; B60L 50/10

USPC ........................................................ 244/1 R
See application file for complete search history.

(56) References Cited

U.S. PATENT DOCUMENTS

| | | | |
|---|---|---|---|
| 11,560,235 B2 * | 1/2023 | Wagner .................. | H02K 11/33 |
| 2016/0244176 A1 * | 8/2016 | Xiao ......................... | H02P 3/14 |
| 2017/0291712 A1 * | 10/2017 | Himmelmann ......... | B64D 27/33 |
| 2017/0320585 A1 * | 11/2017 | Armstrong ............. | B64D 27/10 |
| 2020/0172235 A1 * | 6/2020 | Nissen ................... | B64D 27/18 |
| 2024/0300657 A1 * | 9/2024 | Baig ......................... | B60L 1/08 |
| 2025/0130022 A1 * | 4/2025 | Paranto ................... | B63G 8/28 |

OTHER PUBLICATIONS

International Search Report for PCT/FR2022/050529 dated Jul. 7, 2022.
Written Opinion for PCT/FR2022/050529 dated Jul. 7, 2022.

* cited by examiner

COMBAT AIRCRAFT WITH ELECTRICAL WEAPON SYSTEM WITH OPTIMIZED POWER MANAGEMENT

CROSS-REFERENCE TO RELATED APPLICATIONS

This is the National Stage application of PCT international application PCT/FR2022/050529, filed on Mar. 22, 2022, which claims the priority of French Patent Application No. 2102946, filed Mar. 26, 2021, both of which are incorporated herein by reference in their entireties.

DESCRIPTION OF INVENTION

Technical Field

The present invention relates to the field of combat aircraft with an electrical weapon system.

State of the Prior Art

Hybrid propulsion aircraft, in particular unmanned drones or aircraft (UAV) are known. The electrical power sources of such aircraft (turbogenerators, batteries) must be capable of delivering the power necessary to move the aircraft, but also of supplying electrical power to the on-board non-propulsion systems, namely the flight control systems (control surfaces, computers, etc.) but also, where applicable, electrical weapon systems, such as electronic weapon systems and directed energy weapons.

The part of the power necessary for the propulsion tends to significantly decrease compared to that necessary for the electrical weapon systems, with the development of such systems.

Such an evolution leads to oversizing the electrical power sources, which is penalizing for the overall weight of the aircraft and consequently limits the mass of the weapon systems which can be on board such aircraft.

In this context, there is a need for an aircraft and a method for implementing it, allowing increasing the electrical power available for the electrical weapon system thereof, while limiting the maximum power level that the electrical power source must be capable of providing and thus avoiding oversizing the latter.

DISCLOSURE OF THE INVENTION

The invention proposes to this end a fixed-wing combat aircraft comprising:
- an electrical power source;
- a propulsion system;
- a low-power non-propulsion assembly, comprising a flight control system;
- a high-power non-propulsion assembly, comprising an electrical weapon system; and
- a management unit.

According to the invention, the management unit is configured to selectively establish on command multiple operating modes comprising:
- a flight mode, in which the management unit distributes the electrical power supplied by the electrical power source depending on the needs to the propulsion system and to the low-power non-propulsion assembly; and
- an attack mode, in which the management unit limits the electrical power supplied by the electrical power source to the propulsion system and to the low-power non-propulsion assembly, to the power required to allow the aircraft to glide, and reserves a majority of the available electrical power for the high-power non-propulsion assembly.

The management unit thus configured allows taking advantage of the ability to glide of the aircraft, due to the fixed wing thereof, in order to reduce the power requirements of the propulsion system and of the low-power non-propulsion assembly during the phases of use of the electrical weapon system, so as to reserve a maximum of electrical power available to the latter.

The invention thus allows optimizing the use of the electrical power available on board the aircraft throughout the flight of the latter, depending on whether or not the electrical weapon system is used.

According to other advantageous aspects of the invention, the connecting device has one or more of the following features, taken in isolation or in all technically possible combinations:
- the electrical power source comprises a turbogenerator and an electrical storage unit;
- the attack mode comprises a standby mode in which the electrical weapon system is off, and a fire mode in which the electrical weapon system is in operation;
- the management unit is configured to set the turbogenerator in a pseudo-idle state and distribute all the electrical power generated by the turbogenerator to the low-power non-propulsion assembly, in the standby mode;
- the management unit is configured to set the turbogenerator in a pseudo-idle state in which a portion of the electrical power generated by the turbogenerator is delivered to the low-power non-propulsion assembly while the rest of the electrical power generated by the turbogenerator is used to recharge the electrical storage unit, in the standby mode;
- the management unit is configured to set the turbogenerator in a full power state and distribute at least one majority of the electrical power generated by the turbogenerator to the electrical weapon system, in the fire mode;
- the management unit is configured to distribute a maximum power deliverable by the electrical storage unit to the electrical weapon system, in the fire mode;
- the electrical weapon system comprises at least one of an electronic weapon system and a directed energy weapon.

The invention also relates to a method for implementing an aircraft of the type described above, successively comprising the steps of:
- A) take-off, climb, and start of cruise, in which the management unit is maintained in flight mode, then;
- B) attack, after switching the management unit to the attack mode, then;
- C) end of cruise and descent, after switching the management unit to the flight mode.

In exemplary implementations of the method, step B) comprises switching the management unit into the standby mode, then switching the management unit into fire mode.

BRIEF DESCRIPTION OF THE DRAWINGS

The invention will be better understood, and other details, advantages and features thereof will appear on reading the following description given by way of non-limiting example and with reference to the appended drawings in which.

In all these figures, identical references can designate identical or similar elements.

DETAILED DISCLOSURE OF PREFERRED EMBODIMENTS

Figure 1:
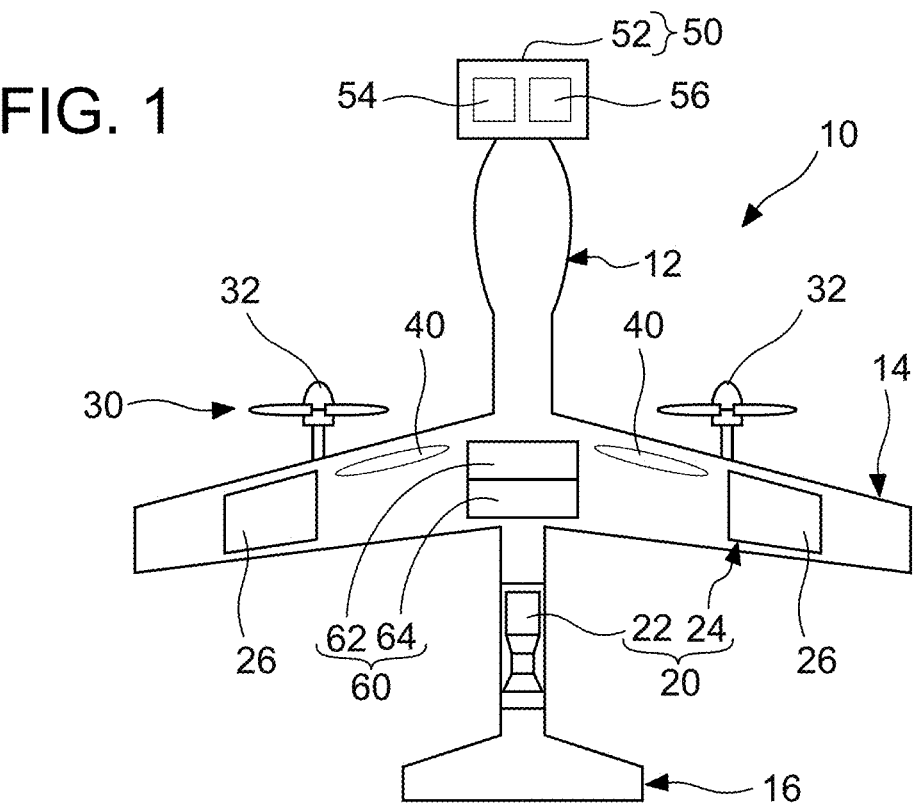
FIG. 1 is a schematic top view of an aircraft according to a preferred embodiment of the invention.

FIG. 1 schematically illustrates a fixed-wing combat aircraft 10 according to a preferred embodiment of the invention, for example an aircraft intended for unmanned flight or drone.

The aircraft 10 comprises for example a fuselage 12, a fixed wing 14, and a tail 16.

The aircraft 10 includes an electrical power source 20. In the preferred case where the aircraft is a hybrid propulsion aircraft, the electrical power source 20 includes one (or more) turbogenerator(s) 22 and an electrical storage unit 24. The turbogenerator offers for example a maximum electrical power of 1 MW. To this end, the turbogenerator includes, for example, a thermodynamic core with a power of 3000 shp ("shaft horsepower") and a high-speed generator whose rotor can reach speeds which are greater than 20,000 rpm (revolutions per minute). The electrical storage unit 24 comprises one (or more) battery(batteries) 26 and is for example designed to generate a high voltage, for example of 800 V (volts).

Alternatively, the aircraft may be purely electrically propelled, in which case the electrical power source can consist solely of one or more batteries.

The aircraft 10 further includes a propulsion system 30, for example consisting of screw propellers 32 distributed over the fixed wing 14 on either side of the fuselage 12. In the illustrated example, the propulsion system 30 consists of two screw propellers 32 each capable of absorbing an electrical power of 500 kW and converting it into thrust.

The aircraft 10 further includes a non-propulsion assembly called low-power non-propulsion assembly 40, comprising a flight control system. Such a system comprises the movable surfaces of the aircraft as well as all means intended for the actuation of the latter. The low-power non-propulsion assembly 40 may also include other auxiliary systems (for example for de-icing).

The aircraft 10 also includes a non-propulsion assembly called high-power non-propulsion assembly 50, comprising an electrical weapon system 52. Such a system comprises at least one of an electronic weapon system 54 and a directed energy weapon 56.

Finally, the aircraft comprises a management unit 60, which is typically defined as encompassing a system 62 for monitoring and distributing electrical power in the aircraft, and a control system 64 capable of driving the different components of the electrical power source 20 (turbogenerator 22, electrical storage unit 24) depending on the needs.

According to the invention, the management unit 60 is configured to selectively establish on command several operating modes comprising:

- a flight mode, in which the management unit 60 distributes the electrical power supplied by the electrical power source 20 depending on the needs to the propulsion system 30 and to the low-power non-propulsion assembly 40; and
- an attack mode, in which the management unit 60 limits the electrical power supplied by the electrical power source to the propulsion system 30 and to the low-power non-propulsion assembly 40, to the power required to allow the aircraft 10 to glide, and reserves a majority of the available electrical power for the high-power non-propulsion assembly 50.

The management unit 60 thus configured allows taking advantage of the ability to glide of the aircraft, due to the fixed wing 14 thereof, in order to reduce the power requirements of the propulsion system and of the low-power non-propulsion assembly during the phases of use of the electrical weapon system, so as to reserve a maximum of electrical power available to the latter.

The invention thus allows optimizing the use of the electrical power available on board the aircraft throughout the flight of the latter, depending on whether or not the electrical weapon system is used.

The control of the management unit 60 for switching from one operating mode to the other is of course ensured by a pilot operating on board the aircraft (in the case of a manned aircraft) or remotely (in the case of an unmanned aircraft) by means of communication systems which can be conventional. Alternatively, the control of the management unit 60 for switching from one operating mode to the other can be operated automatically according to a pre-established flight plan.

More specifically, the attack mode comprises a standby mode in which the electrical weapon system 52 is off, and a fire mode in which the electrical weapon system 52 is in operation. This last mode therefore corresponds to the triggering or shooting phases of the electrical weapon system 52.

In the standby mode, the management unit 60 is advantageously configured to set the turbogenerator 22 in a pseudo-idle state and use all electrical power generated by the turbogenerator to allow the operation of the low-power non-propulsion assembly 40, and if the storage unit 24 is not sufficiently charged to guarantee the possibility of subsequently triggering the electrical weapon system 52, allow charging of the latter.

In the fire mode, the management unit 60 is configured to set the turbogenerator 22 in a full power state and distribute at least a majority of the electrical power generated by the turbogenerator 22 to the electrical weapon system 52 in order to allow the triggering of the latter.

A method for implementing an aircraft of the type described above successively comprises steps of:

A) take-off, climb, and start of cruise, in which the management unit 60 is maintained in flight mode, then;

B) attack, after switching the management unit 60 to the attack mode, then;

C) end of cruise, and descent, after switching the management unit to the flight mode 60.

Figure 2:
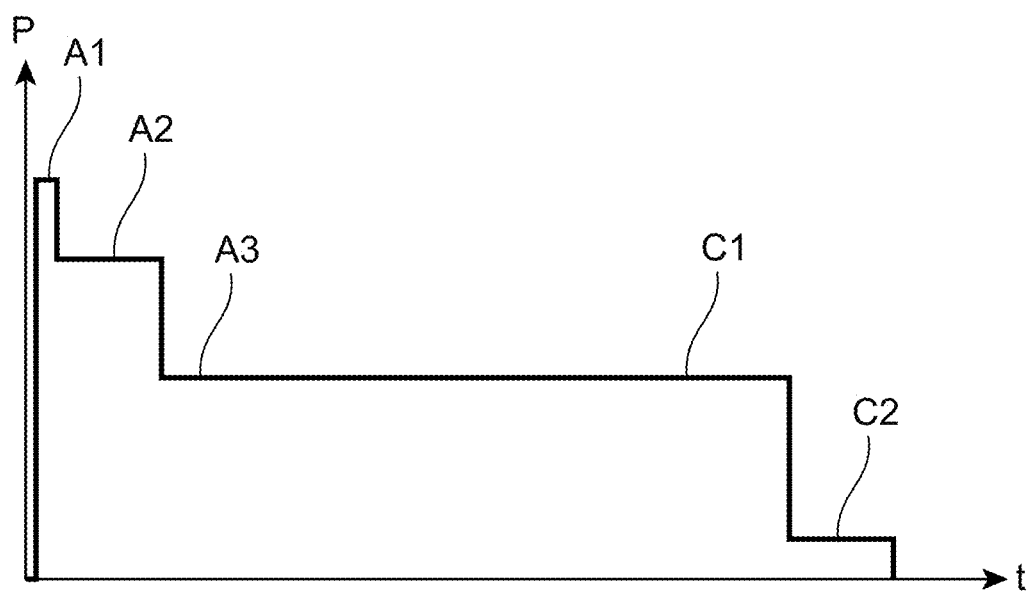
FIG. 2 is a diagram illustrating the overall power consumption of the propulsion system and of the assembly of an aircraft of a known type during a typical mission.

Unlike a conventional power management strategy which does not take into account the specific needs of the electrical weapon systems, illustrated by the diagram in FIG. 2 and simply comprising a take-off phase A1, a climb phase A2, a cruise phase A3/C1, then a descent and landing phase C2, the method according to the invention is based on a power management strategy taking no account of the specific needs of the electrical weapon systems.

Step B specific to the invention comprises one or more operating phases B1 in standby mode, and possibly one or more phases of triggering the electrical weapon system 52 corresponding to the fire mode B2.

Figure 3:
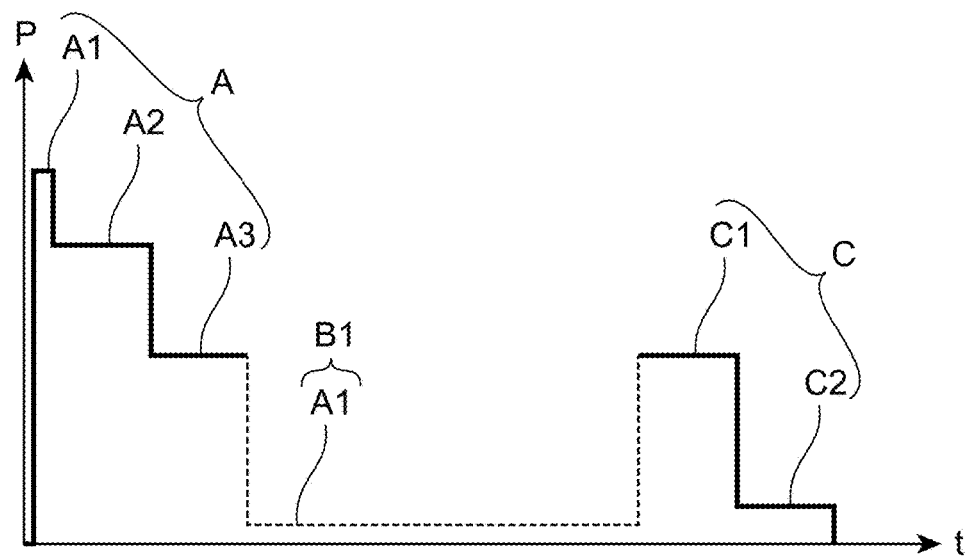
FIG. 3 is a diagram illustrating the overall power consumption of the aircraft of FIG. 1 during an example of mission.
Figure 4:
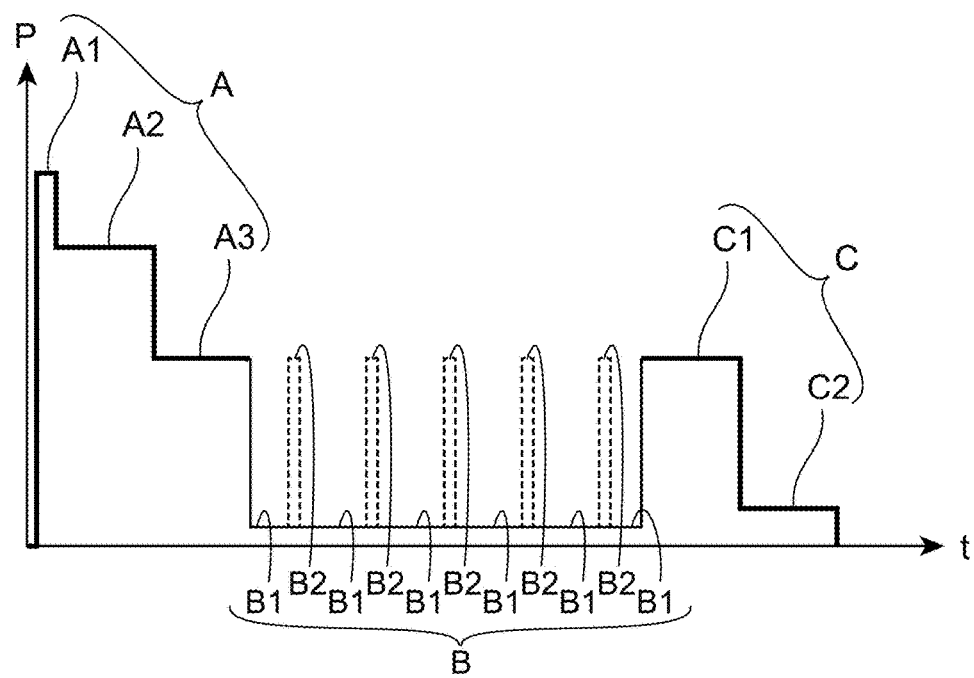
FIG. 4 is a diagram illustrating the overall power consumption of the aircraft of FIG. 1 during another example of mission.

Thus, FIG. 3 is a diagram similar to that of FIG. 2, illustrating the sequence of the steps of the method according to the invention during an example of mission, comprising an operating phase B1 in standby mode without effective use of the electrical weapon system 52, while FIG. 4 is a similar diagram in the case where step B comprises an alternation of operating phases B1 in standby mode and of operating phases B2 in fire mode, during which the electrical weapon system 52 is actually used. To this end, the management unit 60 repeatedly switches from standby mode to fire mode and vice versa.

Figure 5:
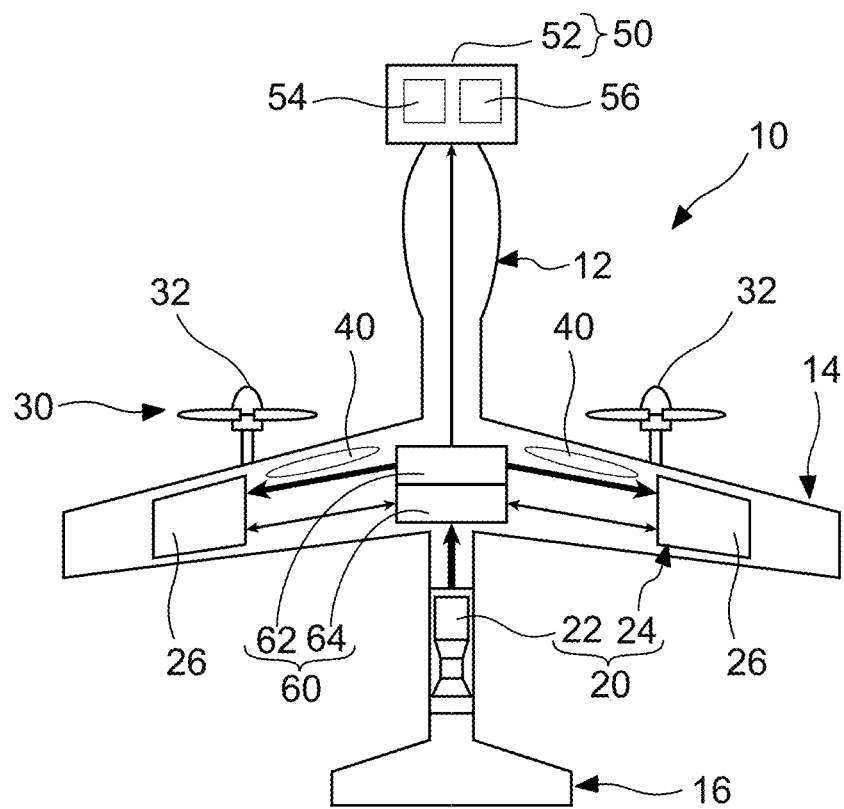
FIG. 5 is a view similar to FIG. 1, illustrating an operating mode of the aircraft of FIG. 1.
Figure 6:
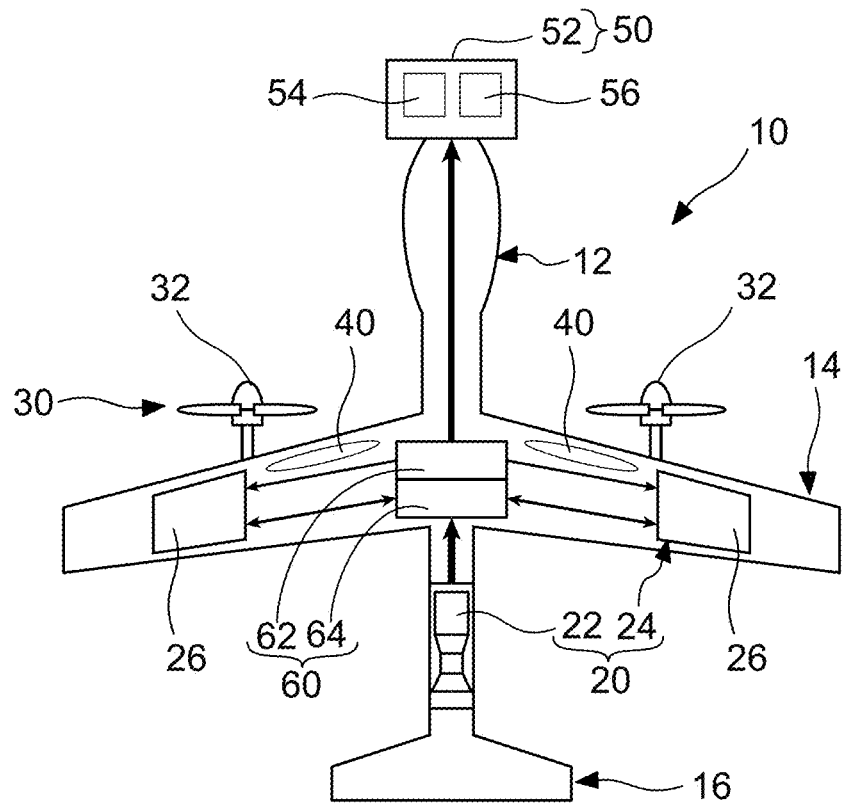
FIG. 6 is a view similar to FIG. 5, illustrating another operating mode of the aircraft of FIG. 1.

FIG. 5 illustrates the power distribution within the aircraft 10 in flight mode, while FIG. 6 illustrates the power distribution in attack mode, the arrows corresponding to the power exchanges between the components of the aircraft, the thickness of the arrows reflecting the level of exchanged power.

What is claimed is:

1. A fixed-wing combat aircraft comprising:
an electrical power source,
a propulsion system,
a low-power non-propulsion assembly comprising a flight control system,
a high-power non-propulsion assembly comprising an electrical weapon system, and
a management unit,
wherein the management unit is configured to selectively establish on command multiple operating modes comprising:
a flight mode, in which the management unit distributes electrical power supplied by the electrical power source depending on the needs to the propulsion system and to the low-power non-propulsion assembly, and
an attack mode, in which the management unit limits the electrical power supplied by the electrical power source to the propulsion system and to the low-power non-propulsion assembly, to a power required to allow the aircraft to glide, and reserves a majority of the electrical power for the high-power non-propulsion assembly.

2. The aircraft according to claim 1, wherein the electrical power source comprises a turbogenerator and an electrical storage unit.

3. The aircraft according to claim 2, wherein the attack mode comprises a standby mode in which the electrical weapon system is off, and a fire mode in which the electrical weapon system is in operation.

4. The aircraft according to claim 3, wherein the management unit is configured to set the turbogenerator in a pseudo-idle state and distribute all the electrical power generated by the turbogenerator to the low-power non-propulsion assembly, in the standby mode.

5. The aircraft according to claim 3, wherein the management unit is configured to set the turbogenerator in a pseudo-idle state in which a portion of the electrical power generated by the turbogenerator is delivered to the low-power non-propulsion assembly while the rest of the electrical power generated by the turbogenerator is used to recharge the electrical storage unit, in the standby mode.

6. The aircraft according to claim 3, wherein the management unit is configured to set the turbogenerator in a full power state and distribute at least a majority of the electrical power generated by the turbogenerator to the electrical weapon system, in the fire mode.

7. The aircraft according to claim 3, wherein the management unit is configured to distribute a maximum power deliverable by the electrical storage unit to the electrical weapon system, in the fire mode.

8. The aircraft according to claim 1, wherein the electrical weapon system comprises at least one of an electronic weapon system and a directed energy weapon.

9. A method for implementing the aircraft according to claim 1, successively comprises the steps of:
A) take-off, climb, and start of cruise, in which the management unit is maintained in flight mode, then
B) attack, after switching the management unit to the attack mode, then
C) end of cruise and descent, after switching the management unit to the flight mode.

10. The method according to claim 9, wherein step B) comprises switching the management unit into a standby mode, then switching the management unit into fire mode.

* * * * *